United States Patent
Malige et al.

(10) Patent No.: US 9,213,731 B2
(45) Date of Patent: Dec. 15, 2015

(54) DETERMINING WHETHER TO RELOCATE DATA TO A DIFFERENT TIER IN A MULTI-TIER STORAGE SYSTEM

(75) Inventors: Raghupathi Malige, San Jose, CA (US); Meher Shah, Newark, CA (US); Tillmann Reusse, Mountain View, CA (US); Gautham Ravi, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 628 days.

(21) Appl. No.: 12/779,773

(22) Filed: May 13, 2010

(65) Prior Publication Data

US 2011/0282830 A1   Nov. 17, 2011

(51) Int. Cl.
*G06F 17/30* (2006.01)
(52) U.S. Cl.
CPC .... *G06F 17/30339* (2013.01); *G06F 17/30221* (2013.01)
(58) Field of Classification Search
CPC ..................... G06F 17/30221; G06F 17/30339
USPC ........................ 707/709, E17.005, 666, 689
See application file for complete search history.

(56) References Cited

U.S. PATENT DOCUMENTS

| | | | |
|---|---|---|---|
| 6,363,388 B1* | 3/2002 | Sprenger et al. | 1/1 |
| 7,822,939 B1* | 10/2010 | Veprinsky et al. | 711/170 |
| 8,315,995 B1* | 11/2012 | Levy | 707/694 |
| 8,429,346 B1* | 4/2013 | Chen et al. | 711/114 |
| 8,555,018 B1* | 10/2013 | Rohr et al. | 711/165 |
| 2006/0218366 A1* | 9/2006 | Fukuda et al. | 711/165 |
| 2008/0027905 A1* | 1/2008 | Jensen et al. | 707/2 |
| 2008/0294611 A1* | 11/2008 | Anglin et al. | 707/3 |
| 2008/0301256 A1* | 12/2008 | McWilliams et al. | 709/214 |
| 2010/0281230 A1* | 11/2010 | Rabii et al. | 711/165 |

* cited by examiner

*Primary Examiner* — Alexey Shmatov
(74) *Attorney, Agent, or Firm* — Wilmer Cutler Pickering Hale and Dorr LLP

(57) ABSTRACT

In general, a block of data in a data file is stored in a multi-tier storage system. The block of data includes multiple rows and multiple entry values per row, including values for a particular entry. The values of the particular entry in the data block can be used to determine whether to move the data block to a different tier of a multi-tier storage system. The block of data can then either be relocated in a different tier or kept in the current tier.

18 Claims, 8 Drawing Sheets

| DATA BLOCK 470 | COLUMN(S) | | |
|---|---|---|---|
| ROW | ENTRY 0 | ENTRY 1 | ENTRY M |
| 0 | <VALUE> | <VALUE> | <VALUE> |
| 1 | <VALUE> | <VALUE> | <VALUE> |
| 2 | <VALUE> | <VALUE> | <VALUE> |
| N | <VALUE> | <VALUE> | <VALUE> |

Figure 4D

| ROW ID (ROW-BLOCK) | TIME STAMP (YEAR) | | | |
|---|---|---|---|---|
| 0-0 | 2008 | <OTHER DATA> | BLOCK 0 | SET C |
| 1-0 | 2008 | <OTHER DATA> | | |
| 2-1 | 2008 | <OTHER DATA> | BLOCK 1 | SET A |
| 3-1 | 2009 | <OTHER DATA> | | |
| 4-1 | 2008 | <OTHER DATA> | | |
| 5-1 | 2009 | <OTHER DATA> | | SET B |
| 6-2 | 2009 | <OTHER DATA> | BLOCK 2 | |
| 7-2 | 2009 | <OTHER DATA> | | |
| 8-2 | 2009 | <OTHER DATA> | | |

Figure 5

DETERMINING WHETHER TO RELOCATE DATA TO A DIFFERENT TIER IN A MULTI-TIER STORAGE SYSTEM

BACKGROUND

Many commercial databases and applications store their data in files. A database may be divided into one or more logical storage units called table spaces, and a table space may contain logical entities, such as tables and indexes. A table space may be stored in one or more physical data files. Thus, a database may store data logically in table spaces and physically in data files associated with a corresponding table space. A data file is associated with only one table space and only one database.

Table spaces may further be divided into logical units referred to as segments, which may be divided into extents. Extents are a collection of contiguous blocks in a data file. For tables, storage space may be allocated on demand as new rows are inserted into a table. Tables may be spread across one or more data files by allocating extents from different data files each time rows are inserted into a table. Thus, a data file may include extents of multiple tables, and a table may include extents from multiple data files.

The data files are typically large in size, and portions of the files are randomly accessed. Accordingly, data stored in some portions of a data file may be subsequently accessed either infrequently or not at all, remaining relatively untouched or cold for extended periods of time or over the remaining life of the data file.

Conventional storage management and file relocation solutions use multi-tier storage systems to balance performance and costs. At higher tiers, performance is better but the cost is higher, while at lower tiers the cost is reduced but so is performance. It is common practice to move older files, which are usually accessed less frequently than newer files, to a lower tier in a multi-tier storage system in order to reduce costs. As a result, extents belonging to multiple tables may be relocated to a lower tier, even if some of those extents are accessed frequently.

More specifically, each block in a table extent usually includes multiple table rows. When an existing row is deleted, the space occupied by the deleted row is marked as free space and a new row may then be inserted into the free space. If a table is subject to frequent deletes and inserts, then blocks in that table will likely include newer rows of data interleaved with older rows of data. Thus, when an entire data file is moved to a lower tier, both newer rows and older rows will be moved to the lower tier, which can degrade performance whenever the newer rows need to be accessed. Even the movement of a single block to a lower tier can adversely impact performance if that block contains both newer rows and older rows.

SUMMARY

In one embodiment, file blocks that contain a mix of older and newer table rows can be identified. Consequently, a block that contains newer rows can be prevented from being relocated to a lower tier in a multi-tier storage system. Furthermore, a block can be monitored after it is moved to a lower tier and, if a new row is added to the block, then the block can be relocated back to a higher tier. Thus, performance is not necessarily impacted when newer rows are accessed.

In one embodiment, a data file that includes multiple blocks of data is stored in a first tier of a multi-tier storage system. Each of the blocks includes multiple rows of data, and each of the rows includes a respective time-based value. In one embodiment, each time-based value indicates a time a corresponding row was added to the data file. In another embodiment, each time-based value indicates a time a corresponding row was last accessed.

In one embodiment, each of the rows is uniquely associated with a row identifier, where each row identifier includes a file number and a block number. A first set of the blocks is identified, where each block in the first set includes a row with a time-based value that is earlier than a prescribed value. A second set of the blocks is also identified, where each block in the second set includes a row with a time-based value that is later than the prescribed value. In one embodiment, members of the first set and members of the second set are identified using tuples of the aforementioned file numbers and block numbers. Using the first and second sets of blocks, a third set of the blocks can be identified—the third set includes blocks that are in the first set but not in the second set. The third set of blocks can be relocated to a second tier of the storage system, where the second tier is ranked lower than the first tier. For example, the third set of blocks can be moved from the first tier to the second tier, or the third set of blocks can be copied to the second tier and deleted from the first tier.

After blocks are relocated to the second tier, the methodology described above can be applied to those blocks to identify whether any of the rows in a block has been modified since the block was relocated. Blocks that have been modified since they were relocated can be moved or copied back to the first tier.

Values other than a time-based value can instead be used to determine which blocks can be moved to the second tier and which blocks can be stored in the first tier. In general, in one embodiment, a block of data in a data file is stored in a multi-tier storage system. The block of data includes multiple rows and multiple entries per row, including values (a value per row) for a particular entry (such as, but not limited to, the time-based entry mentioned above). The values of the particular entry in the data block can be used to determine whether to move the data block to a different tier of the multi-tier storage system. The block of data can then either be relocated to a different tier or kept in the current tier. The block of data can be subsequently evaluated to determine whether it should be moved from its current tier to a different tier. More specifically, the block of data can stay in its current tier, be moved to a higher tier (if there is one), or be moved to a lower tier (if there is one). If the block of data has been previously moved from one tier to another, the block of data can stay in its current tier, be moved back to its previous tier, or be moved to yet another tier (if there is one).

In another embodiment, a block of data in a data file is accessed. The values for a particular entry (such as, but not limited to, the time-based entry mentioned above) in the data block are checked to see whether they satisfy a condition. Based on the results, a tier in a multi-tier storage system is selected, and the block of data can then be stored in the selected tier.

Thus, according to embodiments of the present disclosure, a more informed decision can be made about which blocks to relocate to lower storage tiers. If a block includes both older and newer rows, for example, then the block may not be moved to a lower tier. If a block includes only older rows, for example, then it can be moved to a lower tier. Costs continue to be reduced by moving less important (e.g., older) blocks to a lower tier; however, higher levels of performance and service are maintained for blocks that include more important (e.g., newer) rows.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIGS. 4A, 4B, 4C, and 4D are block diagrams illustrating elements of a database and their relationships according to an embodiment of the present disclosure.

FIG. 5 illustrates an example of a block of data according to an embodiment of the present disclosure.

DETAILED DESCRIPTION

Figure 1:
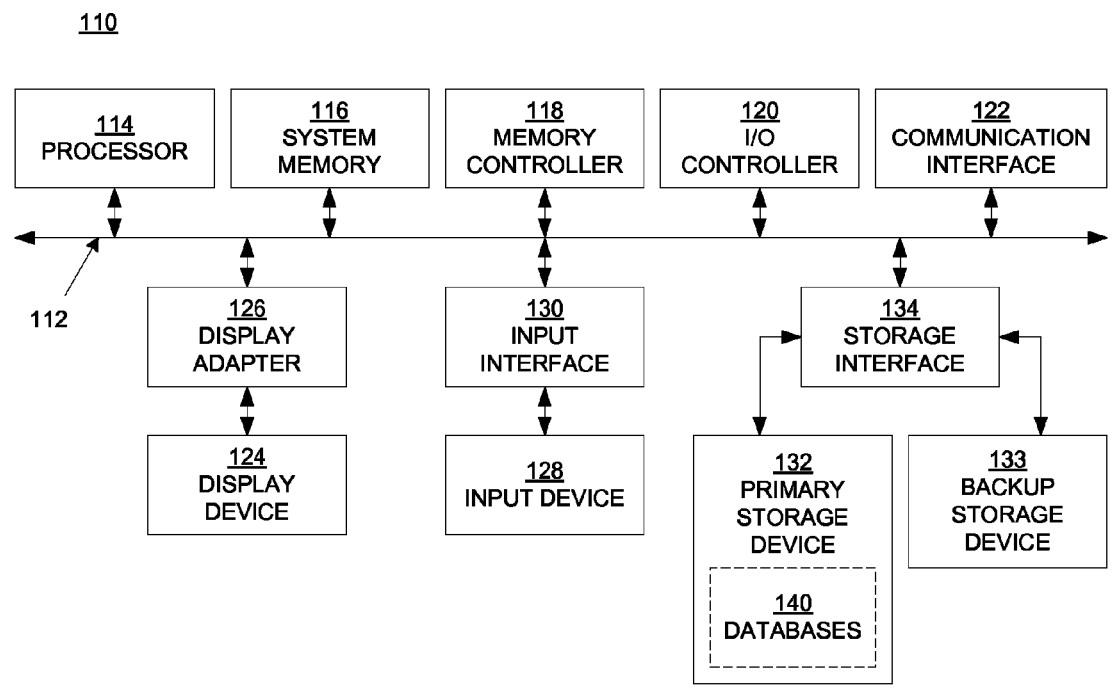
FIG. 1 is a block diagram of an example of a computing system capable of implementing embodiments of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "using," "selecting," "storing," "comparing," "indicating," "determining," "relocating," "moving," "copying," "deleting," "identifying," or the like, refer to actions and processes (e.g., flowcharts 600, 700, and 800 of FIGS. 6, 7, and 8, respectively) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein. For example, processor 114 may perform and/or be a means for performing, either alone or in combination with other elements, one or more of the identifying, determining, using, implementing, translating, tracking, receiving, moving, and providing described herein. Processor 114 may also perform and/or be a means for performing any other steps, methods, or processes described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112. Memory controller may perform and/or be a means for performing, either alone or in combination with other elements, one or more of the operations or features described herein.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134. I/O controller 120 may be used, for example, to perform and/or be a means for performing, either alone or in combination with other elements, one or more of the operations described herein. I/O controller 120 may also be used to perform and/or be a means for performing other operations and features set forth in the instant disclosure.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through, for example, a local area network (such as an Ethernet network), a personal area network, a telephone or cable network, a cellular telephone connection, a satellite data connection, or any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution. Communication interface 122 may perform and/or be a means for performing, either alone or in combination with other elements, one or more of the operations disclosed herein. Communication interface 122 may also be used to perform and/or be a means for performing other operations and features set forth in the instant disclosure.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data from communication infrastructure 112 (or from a frame buffer, as known in the art) for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device. In one embodiment, input device 128 may perform and/or be a means for performing, either alone or in combination with other elements, one or more of the operations disclosed herein. Input device 128 may also be used to perform and/or be a means for performing other operations and features set forth in the instant disclosure.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or a plurality of databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Storage devices 132 and 133 may be used to perform, and/or be a means for performing, either alone or in combination with other elements, one or more of the operations disclosed herein. Storage devices 132 and 133 may also be used to perform, and/or be a means for performing, other operations and features set forth in the instant disclosure.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware. For example, computing system 110 may be configured as an application specific integrated circuit (ASIC) adapted to implement one or more of the embodiments disclosed herein.

Figure 2:
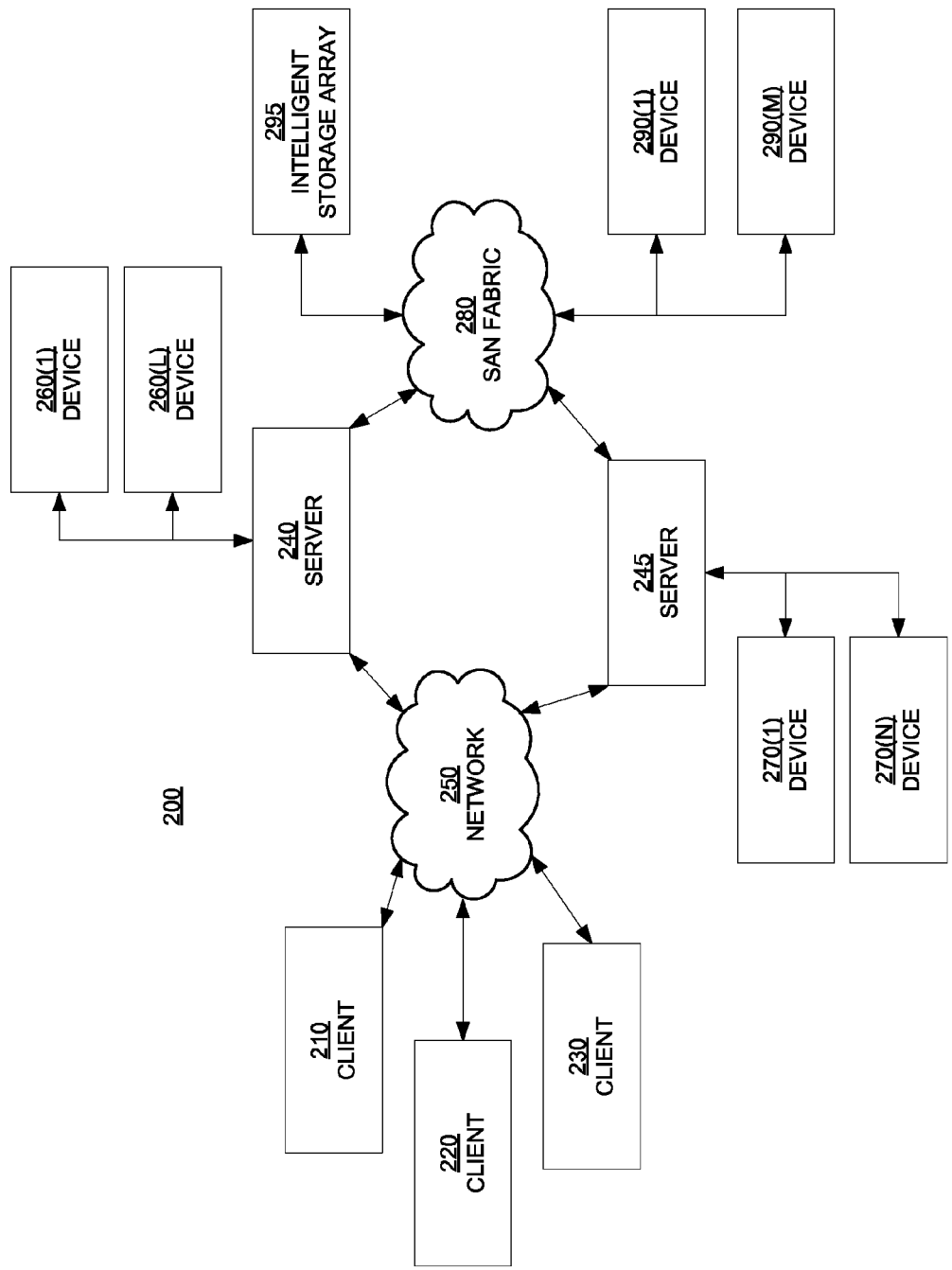
FIG. 2 is a block diagram of an example of a network architecture capable of implementing embodiments of the present disclosure.

FIG. 2 is a block diagram of an example of a network architecture 200 in which client systems 210, 220, and 230 and servers 240 and 245 may be coupled to a network 250. Client systems 210, 220, and 230 generally represent any type or form of computing device or system, such as computing system 110 of FIG. 1.

Similarly, servers 240 and 245 generally represent computing devices or systems, such as application servers or database servers, configured to provide various database services and/or run certain software applications. Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to server 240. Similarly, one or more storage devices 270(1)-(N) may be directly attached to server 245. Storage devices 260(1)-(L) and storage devices 270(1)-(N) generally represent any type or form of storage device or medium capable of storing data and/or other computer-readable instructions. Storage devices 260(1)-(L) and storage devices 270(1)-(N) may represent network-attached storage (NAS) devices configured to communicate with servers 240 and 245 using various protocols, such as Network File System (NFS), Server Message Block (SMB), or Common Internet File System (CIFS).

Servers 240 and 245 may also be connected to a storage area network (SAN) fabric 280. SAN fabric 280 generally represents any type or form of computer network or architecture capable of facilitating communication between storage devices. SAN fabric 280 may facilitate communication between servers 240 and 245 and storage devices 290(1)-(M) and/or an intelligent storage array 295. SAN fabric 280 may also facilitate, via network 250 and servers 240 and 245, communication between client systems 210, 220, and 230 and storage devices 290(1)-(M) and/or intelligent storage array 295 in such a manner that devices 290(1)-(M) and array 295 appear as locally attached devices to client systems 210, 220, and 230. As with storage devices 260(1)-(L) and storage devices 270(1)-(N), storage devices 290(1)-(M) and intelligent storage array 295 generally represent any type or form of storage device or medium capable of storing data and/or other computer-readable instructions.

With reference to computing system 110 of FIG. 1, a communication interface, such as communication interface 122, may be used to provide connectivity between each client system 210, 220, and 230 and network 250. Client systems 210, 220, and 230 may be able to access information on server 240 or 245 using, for example, a Web browser or other client software. Such software may allow client systems 210, 220, and 230 to access data hosted by server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in server 240, run by server 245, and distributed to client systems 210, 220, and 230 over network 250. Accordingly, network architecture 200 may perform and/or be a means for performing, either alone or in combination with other elements, one or more of the operations disclosed herein. Network architecture 200 may also be used to perform and/or be a means for performing other operations and features set forth in the instant disclosure.

Figure 3A:
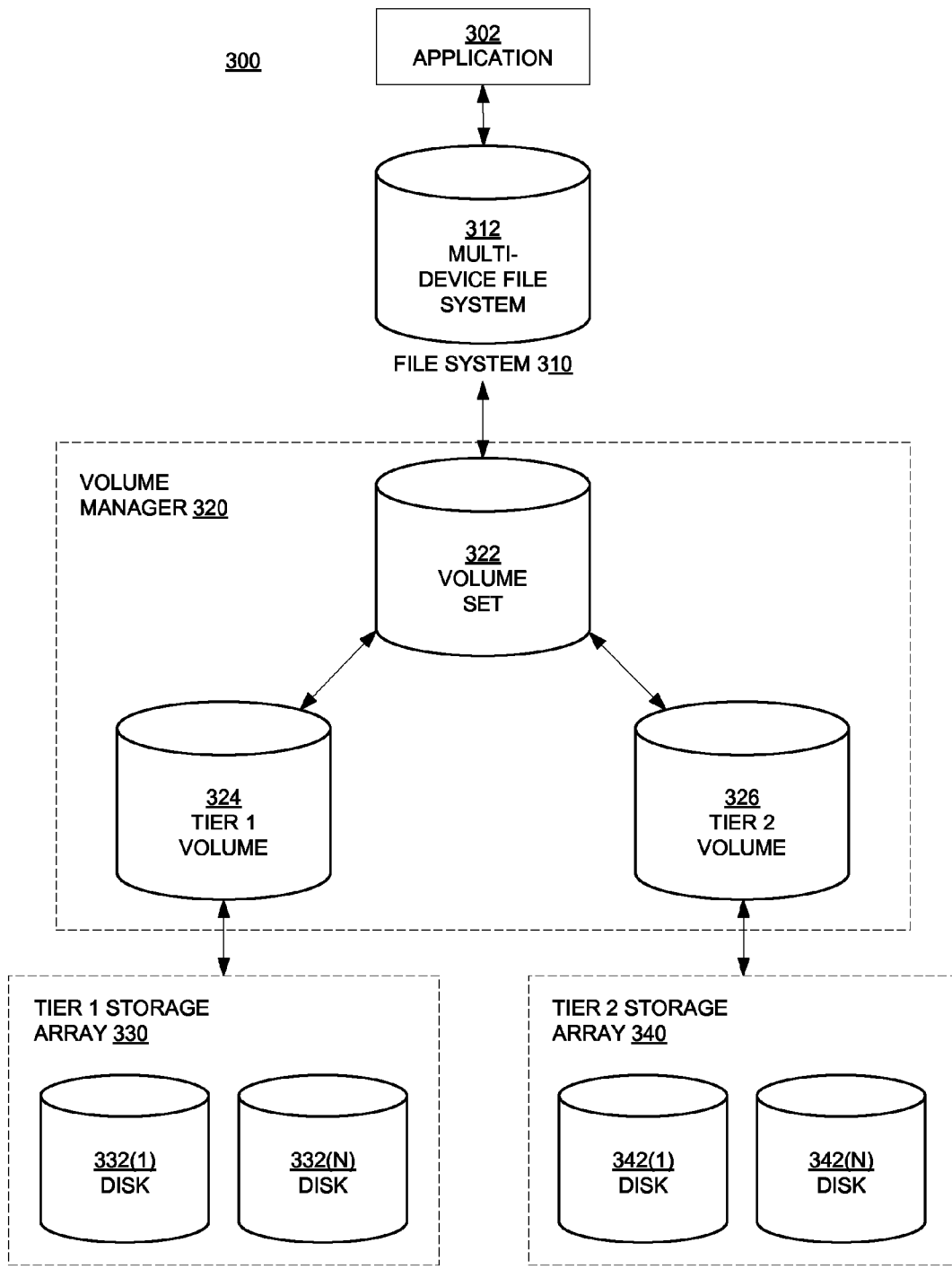
FIGS. 3A and 3B are block diagrams of examples of a multi-tier storage system capable of implementing embodiments of the present disclosure.

FIG. 3A is a block diagram of an example of a multi-tier storage system 300 upon which embodiments of the present disclosure may be implemented. System 300 may include an application 302 in communication with a file system 310. File system 310 may include a multi-device file system 312 for multi-tier storage. Multi-tier storage generally refers to the use of virtual or physical storage devices with different characteristics to provide differentiated storage for computing systems. Each tier may be ranked based on those characteristics. For example, storage devices in a multi-device file system may have different I/O performance, availability, and/or cost characteristics and may be ranked accordingly. In other words, higher ranked tiers may result in higher performance at a higher cost/price, and lower ranked tiers may result in lower performance at a reduced cost/price.

Storage system 300 can support multi-volume file systems through multi-device file system 312 and can provide automatic policy-based placement of portions (e.g., extents or blocks) of files within file system 310. A multi-volume file system may include file systems that occupy two or more virtual storage volumes. A multi-volume file system may present a single name space, making the existence of multiple volumes transparent to users and applications while maintaining awareness of each volume's identity, making it possible to control the locations at which portions of files are stored. In one embodiment, all files in multi-volume file system may be part of the same name space and are accessed and manipulated as though they occupy a single volume.

System 300 may also include a volume manager 320. Volume manager 320 may implement software-based virtualization for facilitating multi-tier storage in the form of virtual volumes configured from multiple hardware devices. Volume manager 320 may include a volume set 322. As used herein, the phrase "volume set" generally refers to the volumes on which a file system is constructed. Volume set 322 may be divided into a tier 1 volume 324 and a tier 2 volume 326. For example, tier 1 volume 324 may include tier 1 storage array 330 (e.g., disk 332(1) through disk 332(N)). Similarly, tier 2 volume 326 may include a tier 2 storage array 340 (e.g., disk 342(1) through disk 342(N)).

Volume set 322 may be configured in a variety of manners. For example, tier 1 volume 324 and/or tier 2 volume 326 may be configured from enterprise disk array logical unit number units (LUNs), mid-range disk array LUNs, and/or disks connected directly to their host systems. Tier 1 volume 324 and/or tier 2 volume 326 may also represent more complex configurations, such as mirrored volumes configured from RAID (Redundant Array of Independent Disks)-5 LUNs presented by two disk arrays.

Volume set 322 may represent a single dimensional storage hierarchy (e.g., a storage hierarchy where better quality storage costs more). In other embodiments, volume set 322 may represent a multi-dimensional storage hierarchy. In such embodiments, storage performance may be influenced by hardware cost and configuration. Storage tiers created from physically similar components may also have significantly different costs based on the functionality they provide. For example, a tier of storage may be configured to take periodic full-sized snapshots or to replicate itself remotely, while another tier utilizing the same basic hardware components may not. As another example, while more expensive devices may outperform less expensive devices, virtual volumes with more columns (e.g., separate disks or LUNs) tend to outperform volumes with fewer columns, and thus the cost per usable byte of the two may be equal.

As a third example, mirrored, RAID-5, and striped LUNs or volumes of equivalent capacity may form an available hierarchy, with higher availability costing more. Additionally or alternatively, mirrored, RAID-5, and striped volumes may have different widths, or numbers of columns, resulting in different performance characteristics and differences in failure protection.

Multi-tier storage systems, such as system 300, may provide improved placement of portions (e.g., extents or blocks) of files based on one or more of a variety of criteria. For example, system 300 may improve placement of portions of files based on actual access patterns, expected access patterns, and access times, to improve load balancing and/or availability, to provide flexibility for data protection, and/or for a variety of other reasons.

As just noted, file portion relocation may be based on access patterns of file portions. In such embodiments, I/O activity for one or more portions of files may be monitored, and relocation may be based on the intensity with which a portion of a file is accessed. Additionally or alternatively, multi-tier storage systems may be implemented to increase efficiency based on expected access patterns. For example, different portions of files may have different I/O performance needs. High data transfer performance may be important for some portions of a file, but less important for other portions of the file.

A multi-tier storage system may also improve load balancing among portions of a file. For example, a file may include numerous extents of a database that are accessed frequently. If such a file is located on a single storage device, the storage device may be overburdened with I/O requests. Multi-tier storage may be implemented to improve I/O response time of such a file by dividing the file among multiple storage devices.

Multi-tier storage systems may further be used to improve data availability. For example, some portions of a file may be critical and may need to be available continually, while other portions of the file may not be affected by downtime. As an example, a portion of a data file may contain point-of-sale or customer relationship management data, which may be critical for day-to-day operations, while another portion of the database file may include human resources data that may not be as critical. Multi-tier data systems presented herein may store such database data on different devices, with the point-of-sale and customer relationship management data being stored on higher availability devices than the human resources data.

Multi-tier storage systems disclosed herein may also provide more flexibility for data protection of portions of a file. Different data sets within a single file may have different commercial value. For example, a single file may include daily business transactions as well as quarterly and annual closing figures. Losing a day's business transactions may be significant to an enterprise but survivable. Losing quarterly or annual closing figures, on the other hand, might be catastrophic. Embodiments of the instant disclosure may store portions of the file that contain quarterly and annual closing figures on highly protected storage devices while storing portions of the file that contain daily business transactions on less protected (e.g., less frequently backed up) storage devices.

Multi-tier storage systems of the instant disclosure may also be implemented for various other general business purposes. For example, enterprise accounting, security, and regulatory compliance policies may require that certain storage devices be restricted to containing specific types of data from a database. Thus, a data file may be divided up for accounting, security, regulatory, and/or any other business purpose.

Figure 3B:
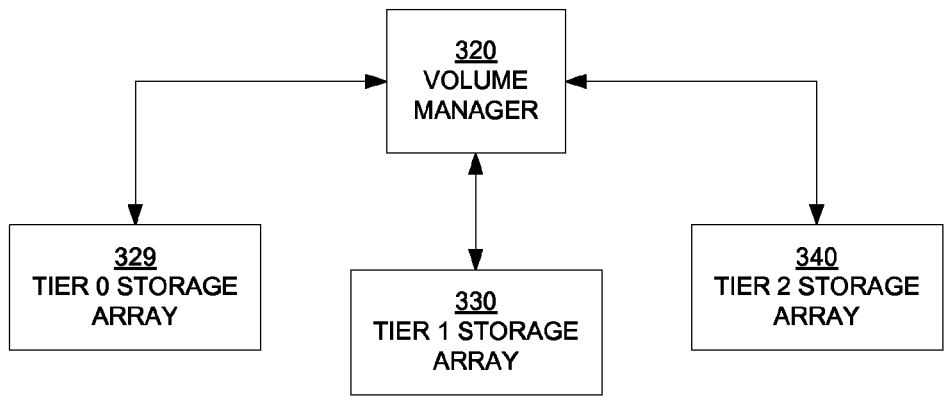

FIG. 3B is a block diagram showing a portion of a multi-tier storage system that includes three tiers: tier 0 storage array 329, tier 1 storage array 330, and tier 2 storage array 340. In the example of FIG. 3B, tier 1 may be the default or standard tier, tier 2 may be a lower-priced/lower performance tier relative to tier 1, and tier 0 may be a higher-priced/higher performance tier relative to tier 1. Tier 0 may be ranked higher than tier 1, which in turn is ranked higher than tier 2. The multi-tier storage system may have any number of tiers, depending on the pricing/performance structure in place and/or the different types of storage devices that may be available in the storage system. Such a multi-tier storage system may not only provide the opportunity for cost savings, but the opportunity to provide premium (e.g., tier 0) services to those willing to pay more.

Figure 4A:
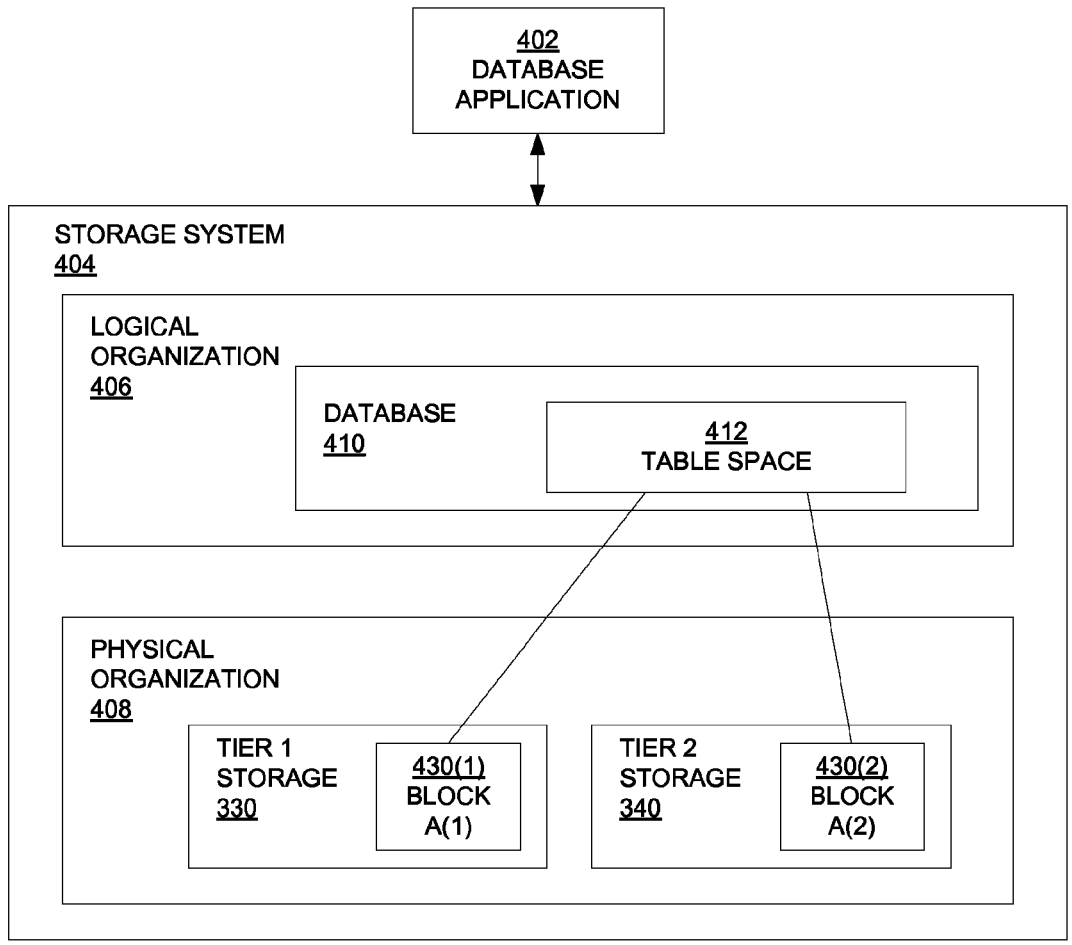

FIG. 4A shows an example of a system 400 illustrating a logical organization 406 and a physical organization 408 of a database 410. System 400 may include a database application 402 and a storage system 404. Database application 402 may be any database application, including ORACLE, SQL (Structured Query Language) Server, MICROSOFT ACCESS, or any other application for managing databases.

Storage system 404 may include database 410 with a table space 412. Table space 412 may be any storage location where data objects for a database are stored. A table space may be used to allocate storage for segments, which may be database objects such as table data and/or indexes (refer also to FIG. 4B). Table space 412 may be stored in one or more physical data files (refer also to FIG. 4C).

Figure 4B:
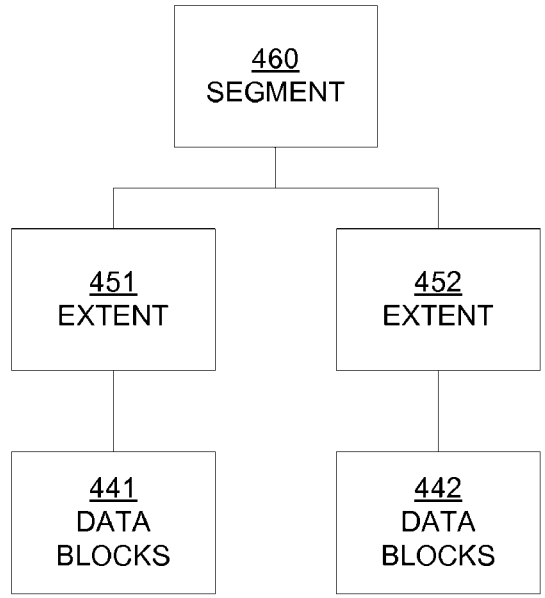

In the example of FIG. 4B, data is stored in contiguous data blocks 441 and contiguous data blocks 442. Each data block corresponds to a certain number of bytes of physical storage space (refer also to FIG. 4D). An extent is a specific number of contiguous data blocks. In the example of FIG. 4B, extent 451 includes data blocks 441, and extent 452 includes data blocks 442. A segment 460 includes a set of extents that are stored in one table space, such as table space 412 of FIG. 4A.

Figure 4C:
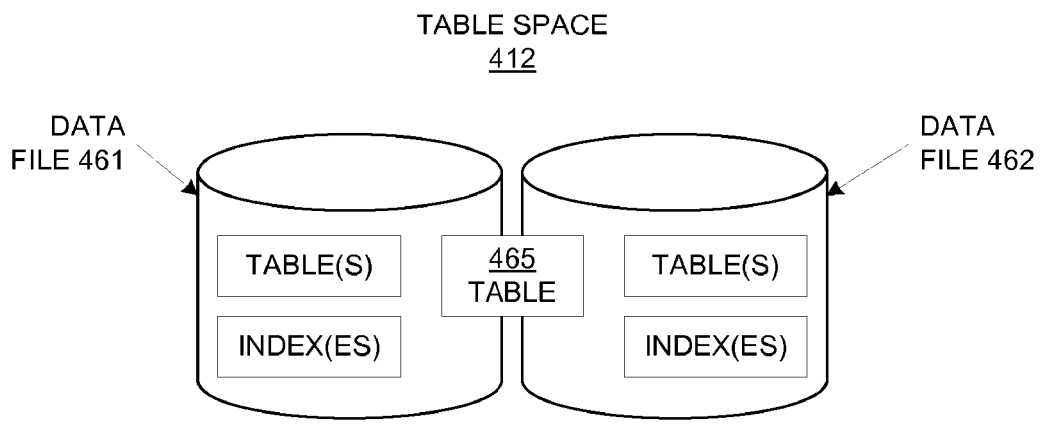

As noted previously herein, database objects may include tables and indexes that may be stored logically in table spaces and physically in data files. In the example of FIG. 4C, table space 412 includes data files 461 and 462. As shown in FIG. 4C, an object (e.g., table 465) can span more than one data file.

FIG. 4D illustrates an example of a data block 470. Data block 470 may include N rows; each row may include M entries or columns. In one embodiment, each row is identified by a signature or row identifier (ID). In one such embodiment, each row ID includes an object number, a file number, a block number, and a row number.

In one embodiment, the entries include a time-based entry. The time-based entry may be a time stamp. The time stamp can have any level of granularity; for example, the time stamp may include only a date, or it may include a date and a time of day (hour, or hour/minute, or hour/minute/second). The time stamp for a row may indicate the time that the row was added to the database, or the time stamp may indicate the time that the row was last accessed.

Absent a time stamp, the entries may include an entry that can be used to derive the equivalent of a time stamp. For example, the entries might include order numbers, where the order numbers are generated sequentially and increase incrementally with time. As such, a lower order number would be associated with an older entry, for example, and thus the order numbers can be used to determine the relative ages of the various rows.

Returning to the example of FIG. 4A, table space 412 is stored physically in file A, shown in two portions as block A(1) 430(1) and block A(2) 430(2). In one embodiment, data of table space 412 is allocated to file A on an extent-by-extent basis.

In the example of FIG. 4A, the physical storage is divided into tier 1 storage 330 and tier 2 storage 340. Tier 1 storage 330 may contain higher quality-of-service storage devices than tier 2 storage 340. Storage system 404 may determine that a first portion (block) of file A, represented as block A(1) 430(1), should be located on tier 1 storage 330, and a second portion of file A, represented as BLOCK A(2) 430(2), should be located on tier 2 storage 340, as described more fully below.

According to embodiments of the present disclosure, data blocks that contain a mix of older and newer table rows can be identified. Consequently, a block that contains newer rows can be prevented from being relocated to a lower tier in a multi-tier storage system. Furthermore, a block can be monitored after it is moved to a lower tier and, if a new row is added to the block, then the block can be relocated back to a higher tier. Thus, performance is not necessarily impacted when newer rows need to be accessed.

In one embodiment, this can be accomplished as follows, with reference to FIG. 5. Consider an example in which a database 500 includes an order entry table that is located in tier 1 (FIG. 3B). In the example of FIG. 5, each row of the database includes a time stamp (only the year is shown), and each row is identified using a simplified row ID in the form of row number and block number; the row number also can include a file number (not shown in FIG. 5). Rows 0 and 1 are associated with block 0, rows 2-5 are associated with block 1, and rows 6-8 are associated with block 2. Block 0 includes data from the year 2008 only, block 1 includes data from the years 2008 and 2009, and block 2 includes data from the year 2009 only.

For the purpose of this example, older data (e.g., blocks that contain data from only the year 2008) are to be relocated to a lower storage tier. Accordingly, a first query can be defined as follows and executed:

| | |
|---|---|
| SELECT | row ID from order_entry |
| WHERE | order_date greater-than to_date ('Jan-1-2008') and |
| | order_date less-than to_date ('Jan-1-2009') |

The row IDs selected as a result of the first query can be processed to compose a sorted set of <file number, block number> tuples, referred to as set A.

Next, a second query can be defined as follows and executed:

| | |
|---|---|
| SELECT | row ID from order_entry |
| WHERE | order_date greater-than to_date ('Jan-1-2009') |

The row IDs selected as a result of the second query can be processed to compose a second sorted set of <file number, block number> tuples, referred to as set B.

Then, the tuples in sets A and B can be processed to delete the members of set B from set A, forming set C. In other words, set C includes only the members of set A that are not also in set B. The tuples in set C represent the file blocks (in the example, only block 0) that do not have any orders from 2009. Accordingly, in the example of FIG. 5, block 0 can be relocated to and stored in a lower storage tier (e.g., tier 2 of FIG. 3B). Block 0 can be relocated by moving the block from the first tier to the second tier, or by copying the block of data to the second tier and then deleting the block of data from the first tier.

After block 0 is moved to tier 2, there is a possibility that one or more of the rows in that block may be updated or modified. For example, one of the rows may be deleted and replaced with new data. For performance reasons, it may be desirable to relocate a block to a higher tier (e.g., back to tier 1) if it contains newer data. Accordingly, queries similar to the ones just described can be executed to identify blocks that contain newer data. More specifically, the second query described above can be re-executed (a different date may be specified) to identify blocks that contain at least one row of newer data. The query can be limited to the blocks in tier 2 to identify blocks in tier 2 that contain at least one row of newer data. Alternatively, the query can be executed across all of the blocks in tier 1 and tier 2 to identify all of the blocks that contain at least one row of newer data, and then a separate query can be executed to identify which of those blocks is in tier 2. In either implementation, blocks in tier 2 that contain newer data can be identified, and those blocks can be relocated to tier 1.

An approach similar to that just described can also be used to identify blocks that can be relocated from tier 1 (or even tier 2) to tier 0 (FIG. 3B).

The example of FIG. 5 relied on time stamps to identify newer and older data; however, embodiments according to the present disclosure are not so limited. For example, as mentioned above, order numbers can be used instead of time stamps.

Also, in the example of FIG. 5, newer data was characterized as being more important than older data and hence the newer data was stored on tier 1. However, attributes other than the age of the data can be used to characterize the relative importance of the data. For example, an enterprise that sells product A may decide to no longer sell that product. Accordingly, data associated with product A may be of reduced importance and as a result can be stored in a lower tier. To accomplish this without degrading the ability to access data for other products, queries such as those described above can be used to identify blocks that contain only data for product A, and those blocks can then be relocated to a lower storage tier.

In the examples above, blocks are described as having multiple rows. At one extreme, a block may include a single row. Thus, the functionality just described can be readily extended to relocating data from one tier to another on a row-by-row basis.

Figure 6:
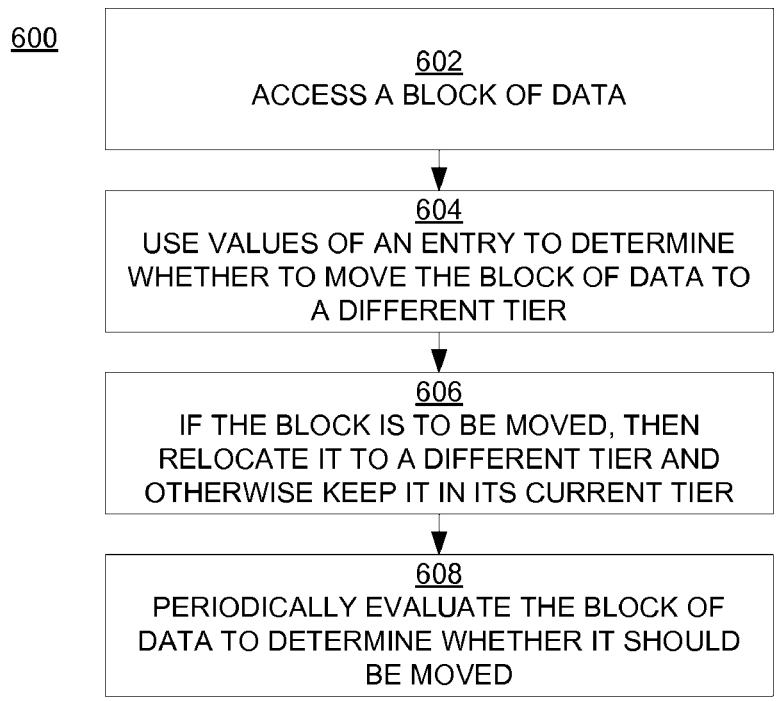
FIG. 6 is a flowchart of a computer-implemented process for selecting a tier to store data according to an embodiment of the present disclosure.
Figure 7:
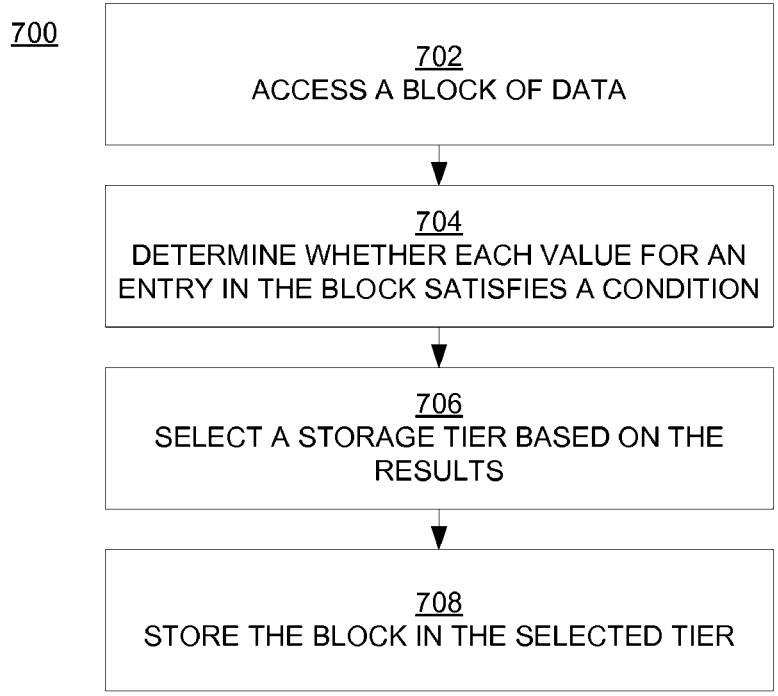
FIG. 7 is a flowchart of a computer-implemented process for selecting a tier to store data according to another embodiment of the present disclosure.
Figure 8:
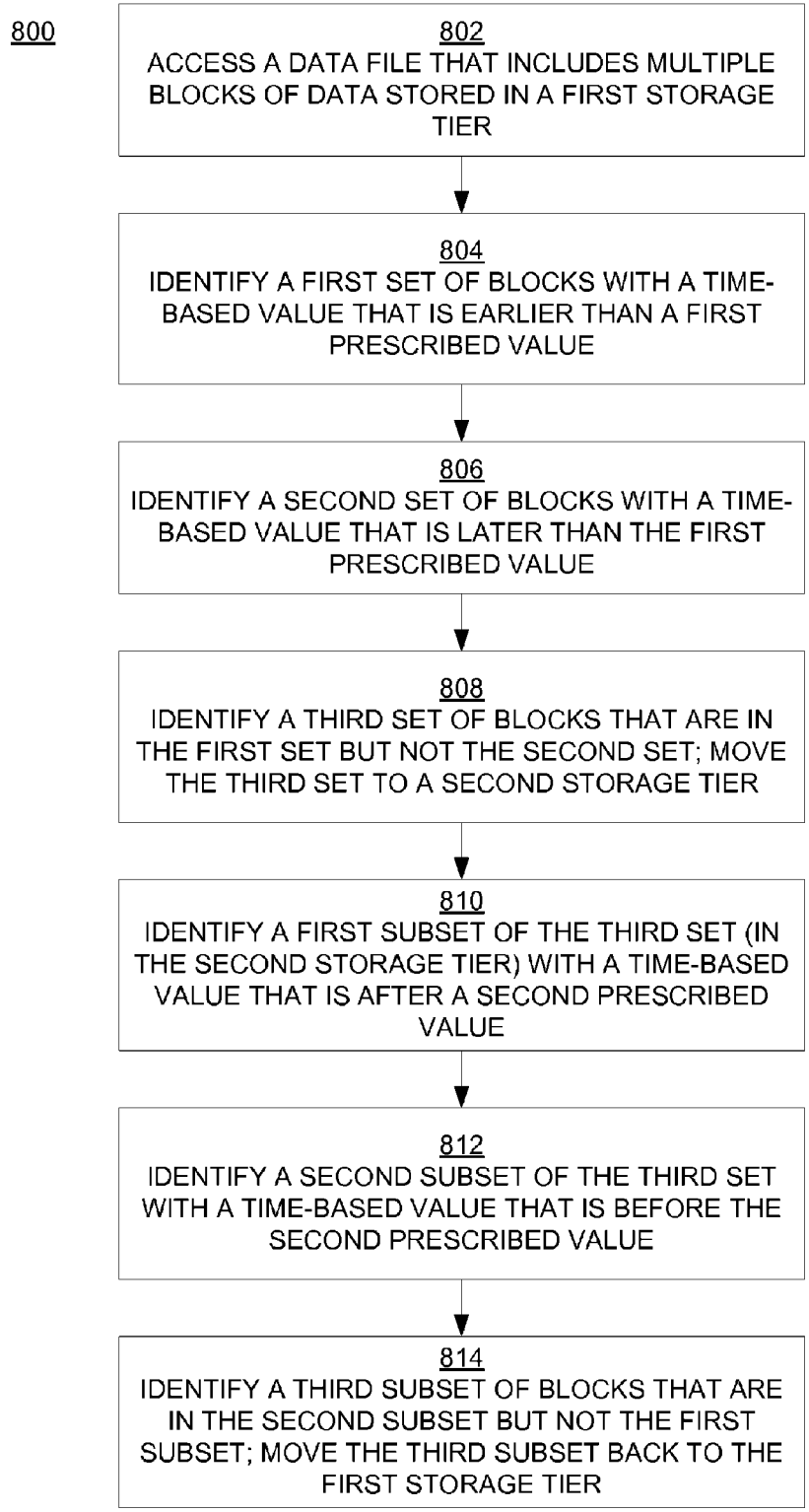
FIG. 8 is a flowchart of a computer-implemented process for identifying data to be moved from one tier to another according to an embodiment of the present disclosure.

FIG. 6 is a flowchart 600 of a computer-implemented process for selecting a tier to store data according to an embodiment of the invention. FIG. 7 is a flowchart 700 of a computer-implemented process for selecting a tier to store data according to another embodiment of the invention. FIG. 8 is a flowchart 800 of a computer-implemented process for identifying data to be moved from one tier to another according to an embodiment of the invention. Flowcharts 600, 700, and 800 can be implemented as computer-executable instructions residing on some form of computer-readable storage medium (e.g., using computing system 110 of FIG. 1).

In block 602 of FIG. 6, a block of data is accessed. The block of data can include multiple rows and multiple entries including a "first" entry, where each of the rows includes a respective value for the first entry (here, "first" is simply used as a designator to identify an entry of interest, and is not used to imply an order or ranking).

In block 604, values of the first entry are used to determine whether to move the block of data from a first tier (the tier in which the block is currently stored) to a second (different) tier of a multi-tier storage system (e.g., system 300 of FIG. 3A).

In one embodiment, the values of the first entry are compared to a specified value, and a tier is selected depending on a result of the comparison. For example, the first entry can identify the name of a product. The product may be one of high importance or interest to an enterprise, or the product may be of low importance or interest to the enterprise. In either case, if each of the values for the first entry in the block of data match the named product, then a higher ranking tier (e.g., tier 0 or 1 of FIG. 3B) is selected if, for example, data for that product is considered important; otherwise, a lower ranking tier (e.g., tier 2 of FIG. 3B) is selected.

In another embodiment, the first entry is time-based. A value of the first entry may indicate the time the corresponding row was added to the block of data, or it may indicate the time the corresponding row was last accessed. In this embodiment, the values of the first entry are compared to a specified time value. A higher ranked tier (e.g., tier 1 of FIG. 3B) of the storage system is selected for the block of data if any of the values of the first entry is later than the specified time value. Otherwise, a lower ranked tier (e.g., tier 2 of FIG. 3B) of the storage system is selected for the block of data.

In block 606 of FIG. 6, if the block of data is to be moved from the first tier, then the block of data is relocated to tier that is selected. Otherwise, the block of data is kept in the first tier.

In block 608 of FIG. 6, the block of data can be subsequently evaluated to determine whether it should be moved from its current tier to a different tier. More specifically, the block of data can stay in its current tier, be moved to a higher tier (if there is one), or be moved to a lower tier (if there is one). If the block of data has been previously moved from one tier to another, the block of data can stay in its current tier, be moved back to its previous tier, or be moved to yet another tier (if there is one).

In block 702 of FIG. 7, a block of data in a data file is accessed. The block of data includes multiple rows and multiple entry values per row including a value per row for a "first" entry (here, "first" is simply used as a designator for an entry of interest, and is not used to imply an order or ranking).

In block 704, a determination is made with regard to whether each value for the first entry in the data block satisfies a condition. In block 706, based on the results of block 704, a tier in a multi-tier storage system is selected.

In one embodiment, as previously discussed herein, the values for the first entry are compared to a specified value, and a tier is selected depending on a result of the comparison. In this embodiment, if all the values for the first entry match the specified value, then tier 1 (FIG. 3B) can be selected (e.g., if the data in the data block is characterized as important or interesting) or tier 2 (FIG. 3B) can be selected (e.g., if the data in the data block is not characterized as important or interesting).

In another embodiment, as previously discussed herein, the first entry is time-based. In this embodiment, the values of the first entry are compared to a specified time value. A higher ranked tier (e.g., tier 1 of FIG. 3B) of the storage system is selected for the block of data if any of the values of the first entry is later than the specified time value. Otherwise, a lower ranked tier (e.g., tier 2 of FIG. 3B) of the storage system is selected for the block of data.

In block 708 of FIG. 7, the block of data is stored in the selected tier.

In block 802 of FIG. 8, a data file is accessed. The data file includes multiple blocks of data and is stored in a first tier (e.g., tier 1 of FIG. 3B) of a multi-tier storage system. Each of the blocks includes multiple rows of data, and each of the rows includes a respective time-based value.

In block 804 of FIG. 8, a first set of the blocks is identified. Each block in the first set includes a row with a time-based value that is earlier than a first prescribed value.

In block 806, a second set of the blocks is identified. Each block in the second set includes a row with a time-based value that is later than the first prescribed value.

In block 808, a third set of the blocks is identified. The third set includes blocks that are in the first set but not in the second set. The third set is moved to a second tier (e.g., tier 2 of FIG. 3B) of the storage system.

In block 810, after the third set of blocks is moved to the second tier, a first subset of the third set of blocks is identified. Each block in the first subset includes a row with a time-based value that is after a second prescribed value.

In block 812, a second subset of the third set of blocks is identified. Each block in the second subset includes a row with a time-based value that is before the second prescribed value.

In block 814, a third subset of third set of blocks is moved back to the first tier. The third subset of blocks includes blocks that are in the first subset but not in the second subset.

Thus, according to embodiments of the present disclosure, a more informed decision can be made about which blocks to relocate to lower storage tiers. If a block includes both older and newer rows, for example, then the block may not be moved to a lower tier. If a block includes only older rows, for example, then it can be moved to a lower tier. In general, if a block includes only information that is characterized as important or interesting, or if a block includes a mix of important/interesting information and information characterized as unimportant or uninteresting, then the block may not be moved to a lower tier; and if a block includes only unimportant/uninteresting information, then it can be moved to a lower tier. Costs are still reduced by moving less important (e.g., older) blocks to a lower tier; however, higher levels of performance and service are maintained for blocks that include more important (e.g., newer) rows.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

The invention claimed is:

1. A non-transitory computer-readable storage medium having computer-executable instructions for causing a computer system to perform a method comprising:
   accessing a block of data in a data file that is stored in a first tier of a multi-tier storage system, wherein said block of data comprises a plurality of rows and a plurality of first entries including a first entry per row, wherein each of said rows comprises a respective value for said first entry;
   comparing each value of said plurality of first entries to a threshold value;
   determining that said block of data is to be moved from said first tier to a second tier of said storage system if each value of said plurality of first entries is above said threshold value, wherein said second tier is different from said first tier and said first tier comprises faster performing storage than said second tier;
   if said block of data is to be moved from said first tier, then relocating said block of data to said second tier, and otherwise continuing to store said block of data in said first tier; and
   repeating said accessing and said determining operations at subsequent points in time to determine whether said block of data should be relocated.

2. The computer-readable storage medium of claim 1 wherein said first entry is time-based, wherein said method further comprises:
   comparing said values of said first entry to a specified time value; and
   selecting said first tier of said storage system for storing said block of data if any of said values is later than said specified time value and otherwise selecting said second tier of said storage system for storing said block of data, wherein said second tier is ranked lower than said first tier.

3. The computer-readable storage medium of claim 2 wherein said values of said first entry indicate times said rows were added to said block of data.

4. The computer-readable storage medium of claim 2 wherein said values of said first entry indicate times said rows were last accessed.

5. The computer-readable storage medium of claim 2 wherein said method further comprises, subsequent to storing said block of data in said second tier:
   determining whether any of said rows has been modified since said storing; and
   relocating said block of data to said first tier if any of said rows has been modified and otherwise maintaining said block of data in said second tier.

6. The computer-readable storage medium of claim 1 wherein said relocating comprises an operation selected from the group of: moving said block of data from said first tier to said second tier; copying said block of data to said second tier and deleting said block of data from said first tier.

7. A computer system comprising:
   a processor; and
   memory coupled to said processor and having stored therein instructions that, if executed by said computer system, cause said computer system to execute a method comprising:
      accessing a block of data in a data file, wherein said block of data comprises a plurality of rows and a plurality of first entries including a first entry per row, wherein each of said rows comprises a respective value for said first entry;
      comparing each value of said plurality of first entries to a threshold value;
      determining that said block of data is to be moved if each value of said plurality of first entries is above said threshold value;
      selecting a tier in a multi-tier storage system based on values of said plurality of first entries of said plurality of rows within said block of data, wherein said tier is selected based on a desired performance level, wherein higher tiers comprise faster performing storage than lower tiers; and
      storing said block of data in said tier that is selected.

8. The computer system of claim 7 wherein said first entry is time-based.

9. The computer system of claim 8 wherein said method further comprises:
   comparing each value for said first entry to a specified time value; and
   selecting a first tier of said storage system for storing said block of data if each value for said first entry is later than said specified time value and otherwise selecting a second tier of said storage system for storing said block of data, wherein said second tier is ranked lower than said first tier.

10. The computer system of claim 9 wherein said method further comprises, subsequent to storing said block of data in said second tier:
   determining whether any of said rows has been updated since said storing; and
   relocating said block of data to said first tier if any of said rows has been updated and otherwise maintaining said block of data in said second tier.

11. The computer system of claim 7 wherein said storing comprises relocating said block of data from a first tier in said storage system to a second tier in said storage system, wherein said relocating comprises an operation selected from the group of: moving said block of data from said first tier to said second tier; copying said block of data to said second tier and deleting said block of data from said first tier.

12. A computer-implemented method comprising:
   accessing a data file comprising a plurality of blocks of data stored in a first tier of a multi-tier storage system, each of said blocks comprising a plurality of rows and a plurality of first entries including a first entry per row, wherein each of said rows comprises a respective time based value for said first entry;
   comparing each value of said plurality of first entries to a threshold value;
   determining that said block of data is to be moved from said first tier to a second tier of said storage system if each value of said plurality of first entries is above said threshold value, wherein said second tier is different from said first tier and said first tier comprises faster performing storage than said second tier;
   if said block of data is to be moved from said first tier, then relocating said block of data to said second tier, and otherwise continuing to store said block of data in said first tier.

13. The method of claim 12 wherein each time-based value indicates a time a corresponding row was added to said data file.

14. The method of claim 12 wherein each time-based value indicates a time a corresponding row was last accessed.

15. The method of claim 12 further comprising, subsequent to said relocating:
   repeating said accessing and said determining operations at subsequent points in time to determine whether said block of data should be relocated.

16. The method of claim 15 further comprising:
   relocating said block of data to a tier of said storage system that is ranked higher than said first tier.

17. The method of claim 12 wherein each row of said rows is uniquely associated with a row identifier, each row identifier comprising a first file number corresponding to said data file and a first block number corresponding to a respective block of said plurality of blocks.

18. The method of claim 17 wherein portions of said block are identified using tuples, each tuple comprising a second file number and a second block number.

* * * * *